(12) United States Patent
Zhang et al.

(10) Patent No.: US 7,206,581 B2
(45) Date of Patent: Apr. 17, 2007

(54) METHOD AND APPARATUS FOR PROCESSING DATA BLOCKS DURING SOFT HANDOVER

(75) Inventors: Guodong Zhang, Farmingdale, NY (US); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/939,256

(22) Filed: Sep. 10, 2004

(65) Prior Publication Data

US 2005/0096054 A1 May 5, 2005

Related U.S. Application Data

(60) Provisional application No. 60/517,779, filed on Nov. 5, 2003.

(51) Int. Cl.
*H04Q 7/20* (2006.01)

(52) U.S. Cl. .................. 455/442; 455/405; 455/436; 455/560; 455/561; 370/352; 370/313; 370/355; 370/469

(58) Field of Classification Search ............. 455/405, 455/560, 561, 436, 442; 370/352, 353, 355, 370/469; 709/231, 234
See application file for complete search history.

(56) References Cited

U.S. PATENT DOCUMENTS 6,445,910 B1 * 9/2002 Oestreich ................ 455/277.1
6,993,342 B2 * 1/2006 Kuchibhotla et al. ....... 455/450
2002/0065064 A1 * 5/2002 Griffith et al. ............. 455/405
2002/0107971 A1 * 8/2002 Bailey et al. .............. 709/231
2003/0007480 A1 * 1/2003 Kim et al. ................. 370/349
2003/0031119 A1 * 2/2003 Kim et al. ................. 370/200
2003/0039270 A1 * 2/2003 Chang et al. .............. 370/469
2003/0050097 A1 * 3/2003 Amirijoo et al. .......... 455/560
2004/0160925 A1 * 8/2004 Heo et al. ................. 370/335
2004/0219917 A1 * 11/2004 Love et al ................. 455/436

(Continued)

OTHER PUBLICATIONS

3GPP2 C.S0002-C, "Physical Layer Standard for cdma2000 Spread Spectrum Systems", 3$^{rd}$ Generation Partnership Project 2 "3GPP2", Version 2.0, Revision C, Jul. 23, 2004.

(Continued)

*Primary Examiner*—Steve M. D'Agosta
(74) *Attorney, Agent, or Firm*—Volpe and Koenig, P.C.

(57) ABSTRACT

A method and apparatus for processing data blocks during soft handover. The apparatus may be a wireless communication system including at least two enhanced uplink soft handover (EU-SHO) Node-Bs and a radio network controller (RNC). Each Node-B decodes a received data block and forwards the decoded data block to the RNC. If the RNC receives at least one copy of a successfully decoded data block, the RNC uses a re-ordering function entity to process the copy of the successfully decoded data block to support in-sequence delivery to higher protocol layers. If the RNC receives more than one copy of a successfully decoded data block, the RNC discards the extra successfully decoded data block copies. The RNC is either a serving-RNC (S-RNC) or a controlling-RNC (C-RNC). Each Node-B includes a medium access control (MAC) entity that handles enhanced uplink dedicated channel (EU-DCH) functionalities.

3 Claims, 3 Drawing Sheets

U.S. PATENT DOCUMENTS

2004/0219920 A1* 11/2004 Love et al. ................. 455/442
2004/0228313 A1* 11/2004 Cheng et al. ............... 370/342

OTHER PUBLICATIONS

3GPP2 C.20003-C, "Medium Access Control (MAC) Standard for cdma2000 Spread Spectrum Systems", 3rd Generation Partnership Project 2 "3GPP2", Version 2.0, Release C, Aug. 2004.

3GPP2 C.S0004-C, "Signaling Link Access Control (LAC) Standard for cdma2000 Spread Spectrum Systems", 3rd Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3rd Generation Partnership Project 2 "3GPP2", Version 2.0, Revision c, Jul. 23, 2004.

3GPP TS 25.309, "Technical Specification Group Radio Access Network"; 3rd Generation Partnership Project; FDD Enhanced Uplink; Overall description; Stage 2 (Release 6) Version 1.0.0 (Sep. 2004).

3GPP TS 25.321, "Technical Specification Group Radio Access Network", 3rd Generation Partnership Project; Medium Access Control (MAC) protocol specification (Release 6), Version 6.2.0 (Jun. 2004).

3GPP TS 25.321, "Technical Specification Group Radio Access Network", 3rd Generation Partnership Project; Medium Access Control (MAC) protocol specification (Release 5), Version 5.6.0 (Sep. 2003).

3GPP TS 25.308, "Technical Specification Group Radio Access Network", 3rd Generation Partnership Project; High Speed Downlink Packet Access (HSDPA); Overall specification; Stage 2, (Release 6), Version 6.2.0 (Sep. 2004).

3GPP TS 25.308, "Technical Specification Group Radio Access Network", 3rd Generation Partnership Project; High Speed Downlink Packet Access (HSDPA); Overall specification; Stage 2, (Release 5), Version 5.4.0 (Mar. 2003).

* cited by examiner

METHOD AND APPARATUS FOR PROCESSING DATA BLOCKS DURING SOFT HANDOVER

CROSS REFERENCE TO RELATED APPLICATION

This application claims priority from U.S. Provisional Patent Application Ser. No. 60/517,779, filed Nov. 5, 2003, which is incorporated by reference as if fully set forth herein.

FIELD OF THE INVENTION

The present invention relates to the field of wireless communications. More specifically, the present invention relates to processing data blocks in a multi-cell wireless communication system, such as a frequency division duplex (FDD) or time division duplex (TDD) system.

BACKGROUND

Methods for improving uplink coverage, throughput and transmission latency are currently being investigated in third generation partnership project (3GPP) in the context of the Release 6 (R6) universal mobile telecommunications system (UMTS) study item "FDD uplink enhancements".

It is widely anticipated that in order to achieve these goals, Node-B (base station) will take over the responsibility of scheduling and assigning uplink resources (physical channels) to users. The principle is that Node-B can make more efficient decisions and manage uplink radio resources on a short-term basis better than the radio network controller (RNC), even if the RNC retains coarse overall control. A similar approach has already been adopted in the downlink for Release 5 (R5) high speed downlink packet access (HSDPA) in both UMTS FDD and TDD modes.

It is also envisioned there could be several independent uplink transmissions processed between a wireless transmit/receive unit (WTRU) and a universal terrestrial radio access network (UTRAN) within a common time interval. One example of this would be medium access control (MAC) layer hybrid automatic repeat request (HARQ) or simply MAC layer automatic repeat request (ARQ) operation where each individual transmission may require a different number of retransmissions to be successfully received by UTRAN. To limit the impact on system architecture, it is expected that protocol layers above the MAC should not be affected by introduction of the enhanced uplink dedicated channel (EU-DCH). One requirement that is introduced by this is the in-sequence data delivery to the radio link control (RLC) protocol layer. Therefore, similar to HSDPA operation in the downlink, a UTRAN re-ordering function is needed to organize the received data blocks according to the sequence generated by the WTRU RLC entity.

A soft handover macro-diversity operation requires centralized control of uplink transmissions in each cell within an active set. The active set may include a plurality of Node-Bs. Retransmissions are generated until successful transmission is realized by at least one of the Node-Bs. Successful transmission is not guaranteed at all of the Node-Bs. Therefore, since a complete set of successful transmissions may not be available within any one Node-B, re-ordering of successful transmissions cannot be accomplished.

SUMMARY

The present invention is related to a method and apparatus for processing data blocks during soft handover. The apparatus may be a wireless communication system, a radio network controller (RNC) or an integrated circuit (IC). The wireless communication system includes at least two enhanced uplink soft handover (EU-SHO) Node-Bs and an RNC. Each Node-B decodes a received data block and forwards the decoded data block to the RNC with an indication of a decoding result, i.e., a cyclic redundancy check (CRC). If the RNC receives at least one copy of a successfully decoded data block, the RNC uses a re-ordering function entity to process successfully decoded data blocks to provide in-sequence delivery to higher protocol layers. If the RNC receives more than one copy of a successfully decoded data block, the RNC discards the extra successfully decoded data block copies. The RNC is either a serving-RNC (S-RNC) or a controlling-RNC (C-RNC). Each Node-B includes a medium access control (MAC) entity that handles enhanced uplink dedicated channel (EU-DCH) functionalities.

BRIEF DESCRIPTION OF THE DRAWING(S)

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENT(S)

Figure 1:
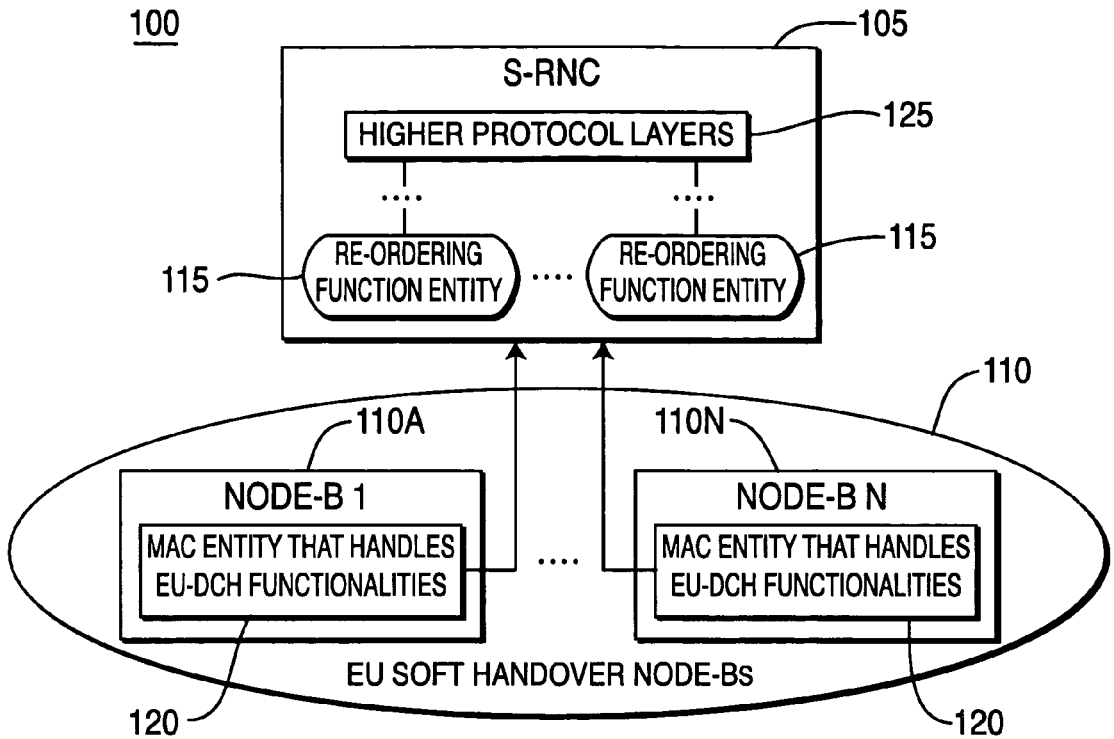
FIG. 1 is a block diagram of a wireless communication system for processing data blocks in a serving-RNC in accordance with a preferred embodiment of the present invention.

The present invention will be described with reference to the drawing figures wherein like numerals represent like elements throughout.

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "base station" includes but is not limited to a Node-B, a site controller, an access point or any other type of interfacing device in a wireless environment.

The present invention may be further applicable to TDD, FDD, and time division synchronous code division multiple access (TD-SCDMA), as applied to UMTS, CDMA2000 and CDMA in general, but is envisaged to be applicable to other wireless systems as well. With respect to CDMA2000, the present invention may be implemented in EV-DO (i.e., data only) and EV-DV (i.e., data and voice).

The features of the present invention may be incorporated into an IC or be configured in a circuit comprising a multitude of interconnecting components.

During soft handover, higher layers maintain an active subset of EU cells for which EU-DCHs are maintained in a soft handover macro diversity state. Those cells in the active subset may be controlled by different EU-SHO Node-Bs.

FIG. 1 shows a wireless communication system 100 including an S-RNC 105 and at least two (2) EU-SHO Node-Bs 110 (110A . . . 110N) operating in accordance with a preferred embodiment of the present invention. One or more re-ordering function entities 115 are implemented at the S-RNC 105 for each WTRU with and without soft handover. The HARQ or ARQ processes for handling EU-DCH functionalities are located in a MAC entity 120 located within each respective EU-SHO Node-B 110. Each re-ordering function entity 115 communicates with higher protocol layers 125 within the S-RNC 105 and includes an associated data buffer (not shown).

Figure 2:
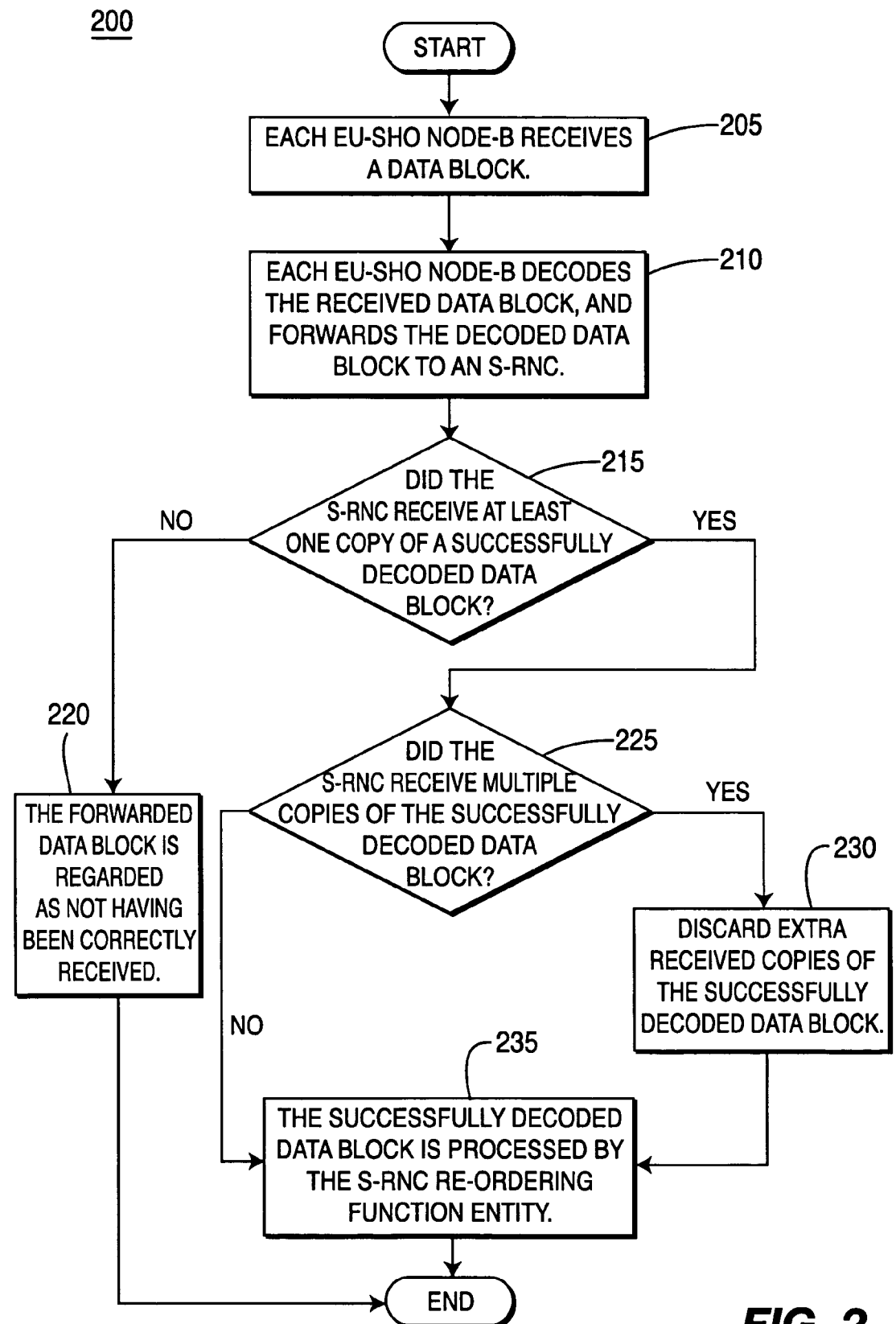
FIG. 2 is a flowchart of a process including method steps for processing data blocks in the system of FIG. 1.

FIG. 2 is a flowchart of a process 200 including method steps for processing data blocks, i.e., packet data units (PDUs), in the system 100 during a soft handover. In step 205, a data block, (i.e., an EU data block), is received at each EU-SHO Node-B 110 from a WTRU. In step 210, each EU-SHO Node-B 110 decodes the received data block, and the decoded data block is forwarded to the S-RNC 105. It should be noted that each EU-SHO Node-B 110 will attempt to decode received EU transmissions. When there is a CRC error, the EU-SHO Node-B 110 cannot forward the received data block to the S-RNC 105, unless the identity of the WTRU and logical channel/MAC-d flow is known by other means. All successfully decoded blocks with good CRC check results are forwarded to the S-RNC 105.

Still referring to FIG. 2, a determination is made as to whether or not at least one copy of a successfully decoded data block is received by the S-RNC 105 from an EU-SHO Node-B 110 (step 215). If it is determined in step 215 that the S-RNC 105 has not received any copy of a successfully decoded data block, the forwarded data block is regarded as not having been correctly received (step 220). If, in step 215, it is determined that at least one copy of a successfully decoded data block has been received by the S-RNC 105 from an EU-SHO Node-B 110, a determination is then made as to whether or not multiple copies of the successfully decoded data block are received from different EU-SHO Node-Bs 110 (step 225).

If step 225 determines that multiple copies of the successfully decoded data block are received from different EU-SHO Node-Bs 110, only one copy will be stored in a re-ordering buffer (not shown) maintained by a re-ordering function entity 115 in the S-RNC 105 as a correctly received data block, and any extra received copies of the successfully decoded data block are discarded as redundant data (step 230).

Finally, in step 235, the successfully decoded data block is processed by the re-ordering function entity 115 in the S-RNC 105. The re-ordering function entity 115 in the S-RNC 105 performs a re-ordering procedure on those successfully decoded data blocks that are correctly received in the re-ordering function entity 115 so as to support in-sequence delivery to the higher protocol layers 125.

Process 200 is beneficial because data blocks received from different EU-SHO Node-Bs 110 can be combined and organized in-sequence for delivery to the higher protocol layers 125 of the S-RNC 105. The re-ordering function entity 115 located within the S-RNC 105 allows enhanced uplink MAC PDU's to be processed for successful reception and proper delivery to higher layers independent of which Node-B(s) that provided reception of each PDU, resulting in the reduction of loss of MAC data and RLC recoveries.

Figure 3:
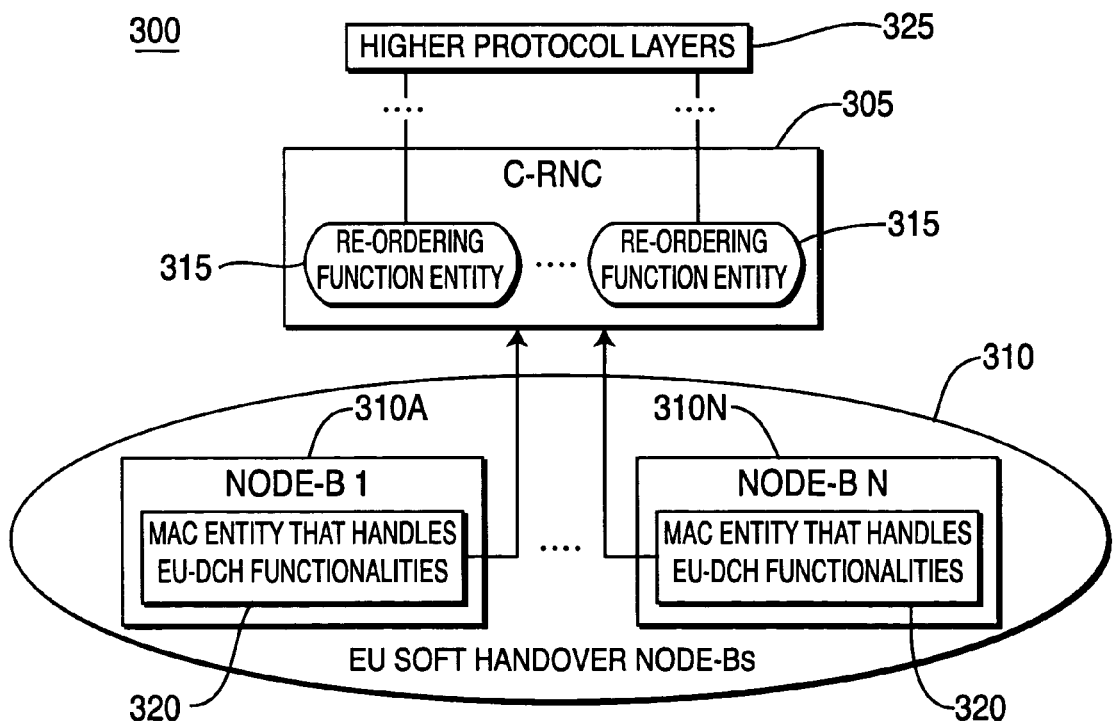
FIG. 3 is a block diagram of a wireless communication system for processing data blocks in a controlling-RNC in accordance with an alternate embodiment of the present invention.

FIG. 3 shows a wireless communication system 300 including a C-RNC 305 and at least two (2) EU-SHO Node-Bs 110 (110A . . . 110N) operating in accordance with an alternate embodiment of the present invention. One or more re-ordering function entities 315 are implemented at the C-RNC 305 for support of soft handover. The HARQ or ARQ processes for handling EU-DCH functionalities are located in a MAC entity 320 located within each respective EU-SHO Node-B 310. Each re-ordering function entity 315 communicates with higher protocol layers 325 external to the C-RNC 305 and includes an associated buffer (not shown).

Figure 4:
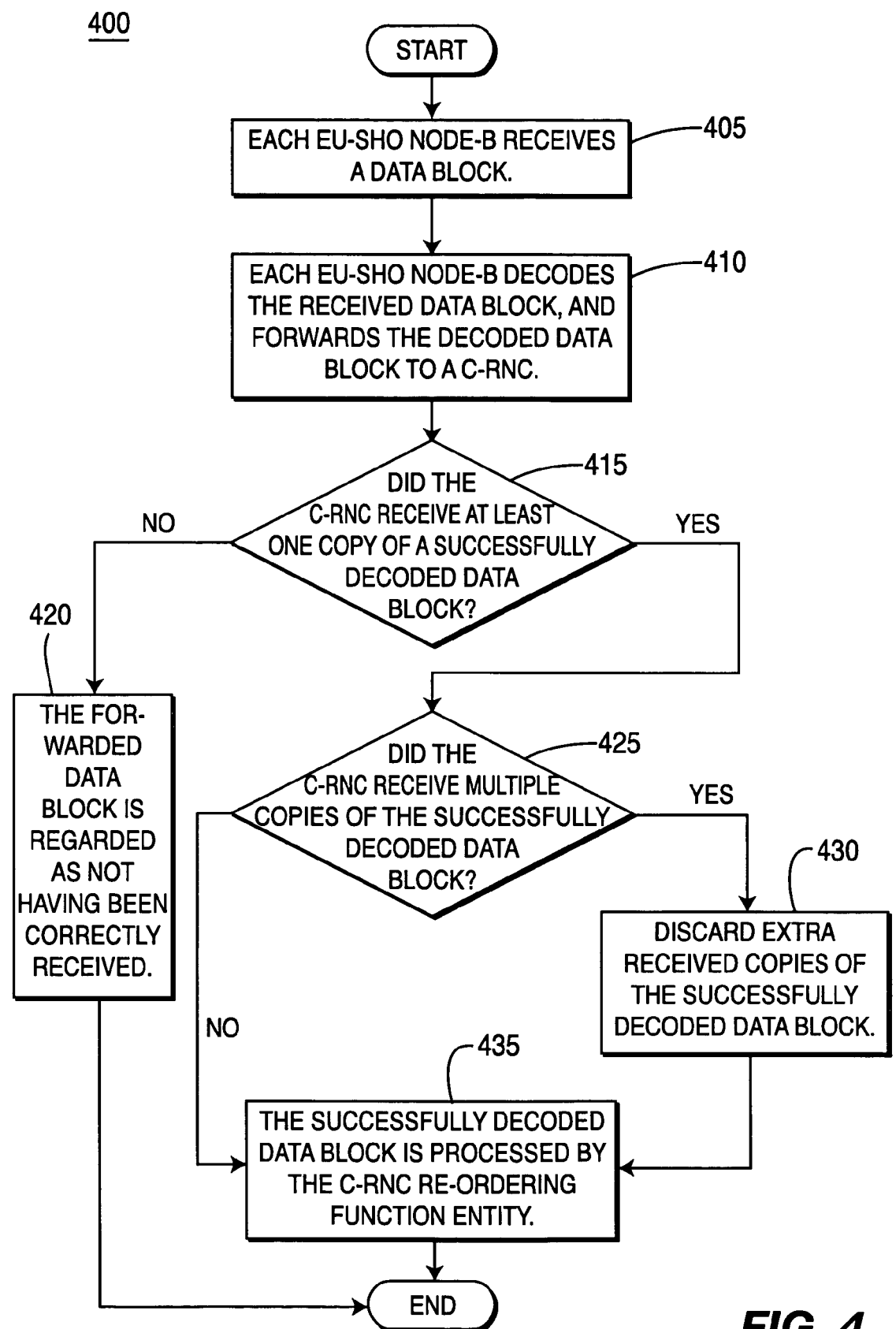
FIG. 4 is a flowchart of a process including method steps for processing data blocks in the system of FIG. 3.

FIG. 4 is a flowchart of a process 400 including method steps for processing data blocks, i.e., PDUs, in the system 300 during a soft handover. In step 405, a data block (i.e., an EU data block) is received at each EU-SHO Node-B 310 from a WTRU. In step 410, each EU-SHO Node-B 310 decodes the received data block, and the decoded data block is forwarded to the C-RNC 305. It should be noted that each EU-SHO Node-B 310 will attempt to decode received EU transmissions. When there is a CRC error, the EU-SHO Node-B 310 cannot forward the received data block to the C-RNC 305, unless the identity of the WTRU and logical channel/MAC-d flow is known by other means. All successfully decoded blocks with good CRC check results are forwarded to the C-RNC 305.

Still referring to FIG. 4, a determination is made as to whether or not at least one copy of a successfully decoded data block is received by the C-RNC 305 from an EU-SHO Node-B 310 (step 415). If it is determined in step 415 that the C-RNC 305 has not received any copy of a successfully decoded data block, the decoded data block forwarded by the EU-SHO Node-Bs 310 is regarded as not having been correctly received (step 420).

If, in step 415, it is determined that at least one copy of a successfully decoded data block has been received by the C-RNC 305 from an EU-SHO Node-B 310, a determination is then made as to whether or not multiple copies of the successfully decoded data block are received from different EU-SHO Node-Bs 110 (step 425).

If step 425 determines that multiple copies of the successfully decoded data block are received from different EU-SHO Node-Bs 310, only one copy will be stored in a re-ordering buffer (not shown) maintained by a re-ordering function entity 315 in the C-RNC 305 as a correctly received data block, and any extra received copies of the successfully decoded data block are discarded as redundant data (step 430).

Finally, in step 435, the successfully decoded data block is processed by the re-ordering function entity 315 in the C-RNC 305, which performs a re-ordering procedure on those successfully decoded data blocks that are correctly received in the re-ordering function entity 315 so as to support in-sequence delivery to the higher protocol layers 325.

Process 400 is beneficial because data blocks received from different EU-SHO Node-Bs 310 can be combined and organized in sequence for delivery to the higher protocol layers 325, provided that these Node-Bs 310 have the same C-RNC 305. This is frequently the case, although its applicability is somewhat more restrictive than placing a re-ordering function in an S-RNC 105. However, this restriction is offset by other considerations. For example, a benefit of C-RNC operation is reduced latency for H-ARQ operation. The performance benefits of minimizing this latency are well understood in the art. During soft handover, it is also desirable to have a common uplink scheduler in the C-RNC

305 for all of the cells that are in the active EU subset, including cells that are controlled by different Node-Bs 310.

While this invention has been particularly shown and described with reference to preferred embodiments, it will be understood by those skilled in the art that various changes in form and details may be made therein without departing from the scope of the invention described hereinabove.

What is claimed is:

1. A method for use in a third generation partnership project (3GPP) frequency division duplex enhanced uplink (EU) communication system, the method comprising:

receiving EU transmission scheduling information from each Node-B in the active set;

transmitting from a wireless transmit/receive unit (WTRU) medium access control (MAC) packet data units (PDUs) over EU channels to Node-Bs in an active set of the WTRU;

scheduling EU transmissions of each Node-B of the active set using a scheduling function of that Node-B;

receiving MAC PDUs from the WTRU by a hybrid automatic repeat request (H-ARQ) function of a MAC entity for each Node-B in the active set;

forwarding from each Node-B MAC entity successfully received MAC PDUs to a serving radio network controller (S-RNC); and receiving successfully received MAC PDUs from the Node-Bs of the active set at the S-RNC and discarding duplicate received MAC PDUs at the S-RNC; and reordering successfully received MAC-PDUs by a reordering function of the S-RNC to be in-sequence in an associated reordering buffer, wherein the in-sequence MAC-PDUs include the successfully received MAC-PDUs from a plurality of the Node-Bs of the active set; and delivering the in-sequence MAC PDUs to a radio link control (RLC) protocol layer; and wherein each of the MAC PDUs is retransmitted from the WTRU to the Node-Bs in the active set until that MAC PDU is successfully received by at least one of the Node-Bs in the active set;

wherein only a single copy of a MAC PDU is stored in the associated reordering buffer; and wherein a controlling radio network controller (C-RNC) comprises a common uplink scheduler for coordinating EU scheduling between the Node-Bs of the active set.

2. The method of claim 1 wherein each of the Node-Bs of the active set decode each received MAC PDU and checks a cyclic redundancy check (CRC) of a data block of that MAC PDU to determine whether that MAC PDU is successfully received.

3. The method of claim 2 wherein only successfully received MAC PDUs are forwarded to the S-RNC.

* * * * *